Aug. 4, 1970    G. F. KRTOUS ET AL    3,522,915

TOOTH PROFILE FOR TOOTHED RING OF SELF-THREADING TAKEUP REEL

Filed Aug. 28, 1968

Inventors:
George F. Krtous,
Bruno Michaels.
By William F. Pinak
John E. Peele Jr. Attys United States Patent Office 3,522,915
Patented Aug. 4, 1970

3,522,915
TOOTH PROFILE FOR TOOTHED RING OF
SELF-THREADING TAKEUP REEL
George F. Krtous and Bruno Michaels, Chicago, Ill.,
assignors to Bell & Howell Company, Chicago, Ill.,
a corporation of Illinois
Filed Aug. 28, 1968, Ser. No. 755,881
Int. Cl. B65h 75/28
U.S. Cl. 242—74                               7 Claims

ABSTRACT OF THE DISCLOSURE

The teeth of a toothed ring for a self-threading motion picture film takeup reel are modified in profile to engage positively in perforations of a film during a takeup operation yet to be disengageable therefrom during film rewind. The tooth is profiled with a root length similar to the longitudinal dimension of a film perforation, a straight rear edge and an inclined forward edge preventing radial movement of film from the root of the tooth while permitting tangential film movement.

---

Figure 1:
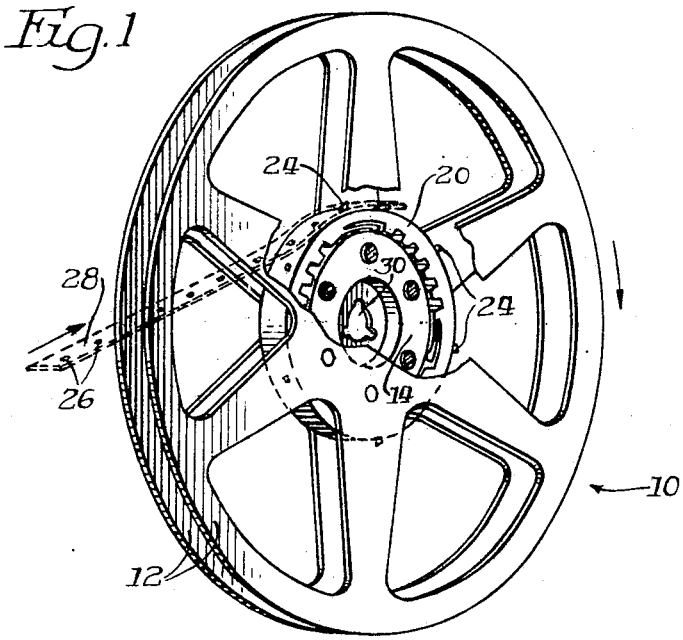

The present invention relates to an improvement in self-threading takeup reels for use on motion picture projectors handling perforated film. Particularly, the invention relates to a specific and novel profile for a takeup reel tooth whereby a film perforation when captured by that tooth may not be inadvertently released from the tooth in a takeup mode but is readily released for rewind of the film from that reel.

For threading most modern motion picture projectors, the leading end of a perforated film is inserted manually into a threading channel in the projector for subsequent automatic feeding through the projector. The film end, upon exiting from the projector's projection station, is guided toward and between the flanges of a takeup reel. A toothed ring or band is provided about the hub of the reel and is retained thereon for limited slipping rotation about the hub. When the film end has been guided between the flanges of the reel, one or more teeth engage in a like number of perforations in the film. Before the film engages the teeth, the reel is rotated at a rate to wind film in excess of the rate of linear movement of the film by the projector. Thus, when the film perforations are initially engaged by the teeth, the toothed ring is abruptly slowed, and sometimes momentarily reversed.

The present invention seeks to eliminate the possibility of film being freed from the teeth of a takeup reel when either the reel or the toothed ring hesitates abruptly during the threading operation. This hesitation occurs until additional film is fed by the projector toward the reel. The reel, or toothed ring, if stopped suddenly, tends to rebound and thus to rotate momentarily in an unwind direction enough to cause disengagement of the teeth from the film perforations. This disengagement often causes misthreading of the reel through failure to catch the leading end of the film.

By altering the profile of the takeup reel teeth, the tendency of film to disengage from the teeth is eliminated. Thus the present invention discloses a takeup reel having a toothed ring supported for slipping rotation about the reel hub in a known manner. The profile of each tooth prevents disengagement of the film from the tooth in that the tip or body of the tooth is enlarged so as to be longer than the longitudinal dimension of the film perforation and the root of the tooth. The root is slightly shorter than the perforation length to permit seating of the film. The rear edge or heel of the tooth is modified to a straight edge surface to enable the film to pass over the tooth and to prevent the film from riding up that edge should reel or tooth ring hesitation occur. Hence, the resulting tooth captures the film and retains the same until the film is removed positively during a rewinding operation. The latter operation backs the tooth from the perforation by generally tangential motion once the heel of the tooth is out of the perforation.

Thus, an object of the invention is to provide a takeup reel tooth profiled for positive film capture during threading and positive film release upon film rewind.

Another object is to provide a novel tooth profile having an enlarged tip portion and a substantially radially extending rear edge.

Further and other objects will be apparent from the description of the accompanying drawings in which like numerals refer to like parts.

Figure 2:
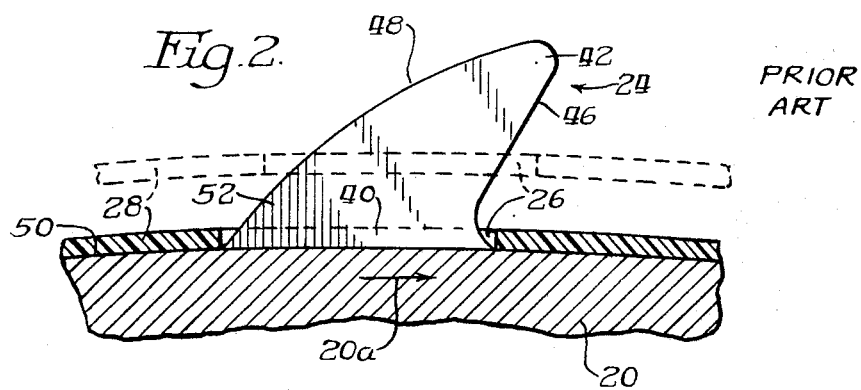
Figure 3:
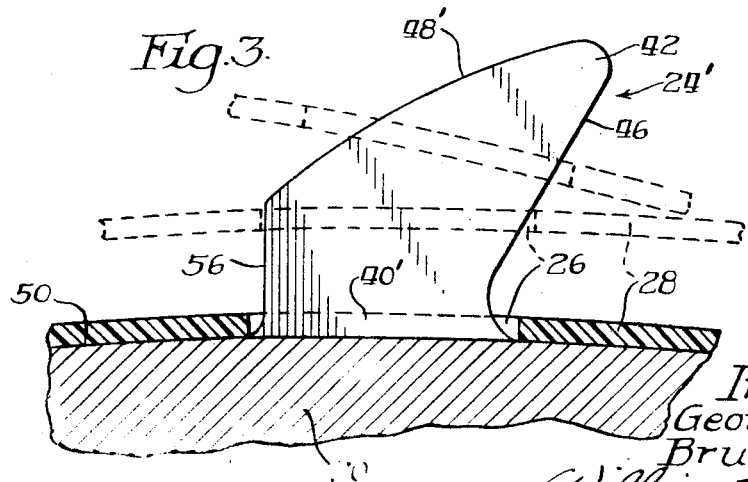

In the drawings:
FIG. 1 illustrates a takeup reel having a slippable toothed ring, with parts broken away;
FIG. 2 shows an enlarged tooth having a prior art profile; and
FIG. 3 shows an enlarged tooth having a profile according to the present invention.

Referring to the drawings, FIG. 1 illustrates a takeup reel 10 having a pair of flanges 12 connected together by hub 14. A ring or band 20 surrounds the hub between the flanges and supports a plurality of teeth 24 aligned for engagement thereof by perforations 26 of a motion picture film 28. The film is fed from a projector between the flanges and toward the hub of the reel. When the leading end of the film is proximate the hub, one or more of teeth 24 will engage in a like number of perforations 26. The reel, powered through a supporting shaft (not shown), which passes through spindle opening 30 in the reel hub, rotates to wind a first and succeeding convolutions of film about the hub after the leading end of the film is carried around the hub by a tooth.

Teeth 24 extend from the periphery of ring 20 to engage in film perforations 26. As seen in FIG. 2, each tooth is of generally rigid construction and has a root or base portion 40 attaching the tooth to the ring. The tooth extends outwardly from the ring as a relatively thin blade or body portion terminating in a tip portion 42. A forward or leading edge surface 46 and a rear or trailing edge surface 48 define the profile of the tooth, and merge into each other and the peripheral edge 50 of ring 20. Lower half 52 of rear edge surface 48 is described as a fillet, which portion slopes into the ring edge 50.

The profile of the prior art tooth 24 is seen to have a rounded tip 42 which enters a film perforation 26 and guides the film 28 down and about root 40 of the tooth. Rear edge 48 is sloped to cause tooth base 40 to be of substantially the same length as the longitudinal dimension of film perforations 26. However, it can be understood that when a film is over the tooth, the film may pivot about an axis on forward portion 46 or bounce upward on the tooth. During such action, the film may ride up the inclined rear edge of the tooth so as to be essentially free of the tooth. That is, when the film catches on the tooth during a reel threading operation as the reel rotates in the direction shown by arrow 20a, the tooth and ring might be halted momentarily and possibly rotated slightly in the direction opposite to the direction of take-up rotation. This action causes a momentary relative shift of the film perforation and the tooth wherein the film moves momentarily to the position as disclosed in dashed lines in FIG. 2. It is readily apparent that a slight forward motion of the film relative to the tooth can cause disengagement of the film from the tooth. This disadvantage of the prior art tooth profile is eliminated by the profile hereinafter described.

The profile of tooth 24' of this invention is disclosed in FIG. 3 and includes a tooth tip 42 joined to a root portion 40' by the tooth blade having forward and rear edge portions 46, 48', respectively. Rear edge portion 48' is different from the similar portion of the prior art tooth in that portion 52 (FIG. 2) is eliminated. The remaining tooth profile is similar to the prior art profile, although the overall tooth dimensions are enlarged so that root 40' is substantially of the same length as the longitudinal dimension of film perforation 26. As seen in FIG. 3, a portion of the tooth blade above the root portion is of greater length than the root portion when considered along a line parallel with the root portion; and also is of greater length than the longitudinal dimension of the film perforation.

Insertion of the enlarged profile tooth into a smaller film perforation is by a relative tangential motion. Although the upper blade portion of the tooth is longer than the perforation, the leading edge tapers rearwardly so that the distance measured perpendicularly and rearwardly of the leading edge is less than the length of a perforation. After tooth tip 42 enters the perforation, leading edge 46 guides the film toward root 40'. The film can seat about root 40' since the fillet portion of the tooth is cut off, leaving a substantially straight edge portion 56. This edge extends substantially radially of the reel and joins the partial rear edge 48' at a heel portion of the tooth, and also joins that rear edge to the peripheral edge 50 of ring 20. This straight edge may extend from edge 50 to approximately 25 to 75% of the height of the tooth. As the tooth enters the perforation in a relative tangential direction, the perforation trailing edge moves over the tooth heel into a position proximate to straight edge 56. In conjunction with the lead edge 46, the straight edge guides the film down to and about root 40'. These edges tend to prevent the film from disengaging from the tooth except by a reverse relative tangential motion. That is, the film cannot move free of the tooth by radial motion alone.

When the film is captured initially, upon threading, the tooth catches in the film perforation as shown in dashed lines (upper) in FIG. 3, so that forward edge 46 guides the film downwardly onto the peripheral edge 50 of ring 20. However, should a momentary shift of the toothed ring occur following engagement, the film is prevented from riding up and off the tooth. As seen in dashed lines (lower) in FIG. 3, the film engages straight edges 56 of the tooth below the junction of the straight edge with the rear edge 48'. Straight edge 56 then blocks the film against such movement that it may slide over or be guided by forward edge 46 of the tooth. The film by engaging at the same time forward edge 46 and straight edge 56, cannot move in a radial direction to become free of the blade portion of the tooth. This positive retention of the film is apparent since the tooth blade portion is longer than the perforation length. Possible forward movement of the film cannot cause disengagement since the film moves only until it engages edge 56, and rearward and upward movement are prevented by forward edge 46. Hence, the next forward rotary increment of the reel will cause the forward edge 46 of the tooth to urge the film again about root 40' of the tooth.

During the rewind operation of the film, the tooth and the reel rotate in a direction opposite to the direction for threading. As the tooth moves counter-clockwise in the shown configuration, the film is substantially tangential relative to the periphery of ring 20 wherein the tooth can back out of the perforation after the heel of the tooth is cleared by the film. That is, during reverse rotation of the reel, the film becomes slack so as to buckle slightly and rides up and over the heel of the tooth, and onto surface 48'. Continued tooth rotation then causes the remainder of the tooth to move out of the perforation. Hence, the present profile is seen to provide both positive film capture for threading mode operation, and positive release for rewinding mode operation.

What is claimed is:
1. A takeup reel for use on a motion picture projector, the reel having spaced flanges connected together by a hub about which a toothed ring is supported for slipping rotation, the teeth on the ring comprising:
   a root portion joining the tooth to the ring;
   a tip portion joined to the root portion by a forward edge and a partial rear edge; and
   a substantially straight edge defining the remainder of the rear edge of the tooth to prevent disengagement of film from the tooth ring during the initial takeup of film by the ring.

2. A reel as claimed in claim 1 wherein the straight edge of the tooth extends approximately one-half the height of the tooth.

3. A reel as claimed in claim 1 wherein the body length of the tooth is of greater length than a perforation of a film with which the reel is to be used.

4. A reel as claimed in claim 1 wherein the body length of the tooth is greater than the root length of the said tooth.

5. A reel as claimed in claim 1 wherein the root of the tooth is of a length substantially equal the length of a film perforation, and the remainder of the tooth body increases in length outwardly from said root to a dimension greater than the length of said film perforation.

6. A reel as claimed in claim 1 wherein the tooth is dimensioned by the straight edge to prevent film disengagement in one direction and to permit film disengagement in the opposite direction of rotation.

7. A reel as claimed in claim 1 wherein the tooth is dimensioned by the straight edge to enable tangential engagement and disengagement with film perforations and prevent radial disengagement.

References Cited

UNITED STATES PATENTS

| | | | |
|---|---|---|---|
| 1,322,114 | 11/1919 | Jenkins | 242—74.2 |
| 3,298,625 | 1/1967 | Babcock | 242—74 |
| 3,315,911 | 4/1967 | Bundschuh et al. | 242—74 |

NATHAN L. MINTZ, Primary Examiner